(12) United States Patent
Liang et al.

(10) Patent No.: US 11,528,684 B2
(45) Date of Patent: Dec. 13, 2022

(54) RESOURCE ALLOCATION METHOD FOR COEXISTENCE OF MULTIPLE LINE TOPOLOGICAL INDUSTRIAL WIRELESS NETWORKS

(71) Applicant: SHENYANG INSTITUTE OF AUTOMATION, CHINESE ACADEMY OF SCIENCES, Liaoning (CN)

(72) Inventors: Wei Liang, Liaoning (CN); Jialin Zhang, Liaoning (CN); Meng Zheng, Liaoning (CN); Sichao Zhang, Liaoning (CN); Kai Wang, Liaoning (CN); Shuai Liu, Liaoning (CN)

(73) Assignee: SHENYANG INSTITUTE OF AUTOMATION, CHINESE ACADEMY OF SCIENCES, Liaoning (CN)

( * ) Notice: Subject to any disclaimer, the term of this patent is extended or adjusted under 35 U.S.C. 154(b) by 152 days.

(21) Appl. No.: 17/044,736

(22) PCT Filed: Nov. 20, 2019

(86) PCT No.: PCT/CN2019/119585
§ 371 (c)(1),
(2) Date: Oct. 1, 2020

(87) PCT Pub. No.: WO2020/181827
PCT Pub. Date: Sep. 17, 2020

(65) Prior Publication Data
US 2021/0127366 A1    Apr. 29, 2021

(30) Foreign Application Priority Data
Mar. 11, 2019  (CN) .......................... 201910179630.2

(51) Int. Cl.
*H04W 72/04* (2009.01)
*H04W 28/02* (2009.01)
(Continued)

(52) U.S. Cl.
CPC ....... *H04W 72/04* (2013.01); *H04W 28/0278* (2013.01); *H04W 28/16* (2013.01); *H04W 72/0493* (2013.01); *H04W 92/02* (2013.01)

(58) Field of Classification Search
CPC . H04W 72/04; H04W 28/0278; H04W 28/16; H04W 72/0493; H04W 92/02;
(Continued)

(56) References Cited

U.S. PATENT DOCUMENTS

| | | | |
|---|---|---|---|
| 2013/0003583 A1* | 1/2013 | Landstrom | H04L 5/006 370/252 |
| 2015/0098322 A1* | 4/2015 | Chen | H04W 28/0252 370/230 |
| 2015/0333878 A1* | 11/2015 | Yu | H04L 1/1861 370/329 |

FOREIGN PATENT DOCUMENTS

| | | |
|---|---|---|
| CN | 101360028 A | 2/2009 |
| CN | 102118307 A | 7/2011 |
| CN | 108737268 A | 11/2018 |

\* cited by examiner

*Primary Examiner* — Ian N Moore
*Assistant Examiner* — Rushil Parimal Sampat
(74) *Attorney, Agent, or Firm* — Novick, Kim & Lee, PLLC; Allen Xue

(57) ABSTRACT

A resource allocation method for coexistence of multiple line topological industrial wireless networks is provided. It pertains to the coexistence problem of multiple TDMA-based line topological industrial wireless networks, including three parts: lower bound analysis of scheduling delay, allocation algorithm of inter-network resources and allocation algorithm of intra-network resources. The method uses (Continued)

overall scheduling delay and resource utilization ratio as measurement indexes when analyzing the lower bound of delay and designing resource allocation algorithms, and selects a best node combination in each time slot to occupy as many channel resources as possible to improve the resource utilization ratio and reduce the overall scheduling delay.

9 Claims, 2 Drawing Sheets

(51) Int. Cl.
*H04W 28/16* (2009.01)
*H04W 92/02* (2009.01)

(58) Field of Classification Search
CPC ........... H04W 74/006; H04W 72/1231; H04W 52/42; H04W 72/1252; H04L 1/1854; H04L 1/1893; H04L 1/1861; H04L 5/0023; H04L 5/003; H04L 5/006; H04B 7/0623; H04B 7/0695; H04B 17/382; H04B 7/0452
See application file for complete search history.

RESOURCE ALLOCATION METHOD FOR COEXISTENCE OF MULTIPLE LINE TOPOLOGICAL INDUSTRIAL WIRELESS NETWORKS

TECHNICAL FIELD

The present invention relates to a resource allocation method for industrial wireless networks, and particularly to a resource allocation method for coexistence of multiple line topological industrial wireless networks.

BACKGROUND

Industry 4.0, as the fusion of the Industrial Internet of Things (IIOT) and the Cyber-Physical System (CPS), points out that digitization, networking and intelligence are the future development directions of the manufacturing industry. As an important part of Industry 4.0, industrial wireless networks are also the basis of intelligent manufacturing. Industry 4.0 has the characteristic of diverse application, which means that a single wireless technology cannot satisfy the need of diverse application. Therefore, multiple wireless networks are required to operate in the same range.

The wireless networks can be classified according to heterogeneous access mechanisms: time division multiple access (TDMA) and carrier sense multiple access (CSMA). Due to the openness of ISM band, TDMA-based industrial wireless networks WirelessHART, ISA100.11a, WIA-PA and WIA-FA, and other wireless networks WiFi, Bluetooth, ZigBee and LTE-U work in this band, which inevitably causes the coexistence problem on the spectrum. Some existing wireless coexistence standards, such as IEEE 802.16h and IEEE 802.19, support coexistence of multiple wireless networks for resource allocation from the architecture, but fail to provide specific resource allocation algorithms. The existing resource allocation algorithm mainly aims at the coexistence problem of CSMA and CSMA networks and the coexistence problem of CSMA and TDMA networks, and only considers the situation that a single channel is available for the coexistence problem of multiple TDMA wireless networks. Therefore, with respect to the need of diversification of Industry 4.0, the coexistence of the TDMA-based wireless networks of any network number and any network size becomes an important problem that needs to be solved urgently.

The line topology is also called a line structure, and is universal in the industrial environments, such as intelligent production lines, smart grids and oil pipeline monitoring. At the same time, the line topology is indispensable in the industrial wireless networks due to the advantages of simple structure and strong scalability. Therefore, a new resource allocation algorithm needs to be designed, to solve the coexistence problem of multiple line topological industrial wireless networks.

SUMMARY

An optimized resource allocation method for coexistence of multiple line topological industrial wireless networks proposed by the present invention is proposed by adequately considering the requirements of minimizing overall scheduling delay. Firstly, the lower bound of scheduling delay of multiple networks is theoretically analyzed, and then the design of the allocation algorithm of inter-network resources and the allocation algorithm of intra-network resources is guided based on theoretical analysis results.

The present invention adopts the following technical solution: a resource allocation method for coexistence of multiple line topological industrial wireless networks comprises the following steps:

obtaining a minimum scheduling delay value required for each network to complete scheduling;

allocating resources for the networks based on the minimum scheduling delay value;

allocating intra-network resources of the networks.

The minimum scheduling delay value is:

$$T = \left\lceil \frac{R_{idle}(j) + \sum_{i=1}^{j} R_O(i)}{C} \right\rceil$$

wherein $R_{idle}(j)$ represents the number of idle resource blocks of j networks, and $R_o(i)$ represents the number of resource blocks occupied by network i, which are respectively represented by the following expressions:

$$R_{idle}(N) = \sum_{t'=1}^{t'=\lfloor 2C/N \rfloor} \left(C - \left\lceil \frac{t'}{2} \right\rceil N\right), t' = \left[1, 2, 3, \ldots, \left\lfloor \frac{2C}{N} \right\rfloor\right]$$

$$R_O(i) = n_i + (n_i - 1) + \cdots + 1 = \frac{n_i(n_i + 1)}{2}$$

N is the number of wireless networks in line topology, and the number of nodes of network i is $n_i$; $i \in [1, N]$; the number of available channels in the networks is C.

The operation of allocating resources for the networks based on the minimum scheduling delay value comprises the following steps:

assessing the priority of each network, i.e., if the network satisfies the following conditions: $S_r=T-t+1$ and $N_d-N_e=N_c-1$, then assessing the network as a high priority and allocating $|N_e|$ resource blocks for the network, and assessing the networks that do not satisfy the conditions as low priority, wherein $S_r$ represents the minimum number of time slots required for completing scheduling; $N_d$ represents a set of nodes with data packets in their node buffers; $N_e$ represents a set of nodes having data packets in their node buffers and empty node buffer in their parents nodes; $N_c$ represents the number of nodes with continuous data packets farthest from a gateway; t is a current time; and T is the minimum scheduling delay value;

for the networks with low priority, sorting the networks in a descending order of $S_r$ according to the required minimum number $S_r$ of time slots obtained during priority assessment, and calculating differences between every two adjacent $S_r$ to obtain two situations that the difference is not greater than 1 and the difference is greater than 1;

for the networks corresponding to $S_r$ with the difference of $S_r$ not greater than 1:

when the difference of $S_r$ is 1, sorting the networks corresponding to $S_r$ in a descending order of $S_r$, and combining the first to $N_l$ node buffers in the networks to form a new network, wherein the node buffers between different networks are separated by empty identifiers, and $N_l$ represents a node label of the last node buffer with data packets;

when the difference of $S_r$ is 0, comparing the number $R_r$ of required resources of the networks corresponding to $S_r$, sorting the corresponding networks in a descending order of $R_r$; and combining the first to $N_l$ node buffers in the networks to form a new network, wherein the node buffers between different networks are separated by empty identifiers, and recording $S_r$ of the new network as a maximum value of $S_r$ in the corresponding networks;

for the corresponding networks of $S_r$ with the difference of $S_r$ greater than 1: sorting the corresponding networks in a descending order of $S_r$ and allocating $N_p$ resource blocks to each network respectively in order, until no idle resource block remains or all the networks have the allocated resource blocks, wherein $N_p$ represents the maximum number of parallel transmission nodes.

The $R_r = \Sum_{k=1}^{n_i}(B_{v_{ik}}(t) \cdot B_{v_{ik}}(t))$ represents the number of data packets in the buffer of the node $v_{ik}$ at the current time t, wherein the label of the node is $k \in [1, n_i]$ and $n_i$ is the number of nodes in the network.

The operation of allocating intra-network resources of the networks comprises the following steps:

a data packet filling process: searching for the node set that meets the conditions $B_{v_{ik}}(t)>0$ and $B_{v_{ik-1}}(t)=0$, sorting in an ascending order of sequence number k and assessing and allocating resources for the nodes that meet the conditions; if $C_i$ resource blocks do not remain, completing the data packet filling process, otherwise performing a data packet collecting process, wherein $C_i$ represents the number of resource blocks allocated to network i at the current time t;

data packet collecting process: searching for nodes in the descending order of node labels from the last node $v_{iN_i}$ with data in the node buffer, and using a node with data packets in the node buffer as a node to be scheduled and comparing with the nodes recorded in a scheduling node set $V_{tr}$; if the node to be scheduled appears in the scheduling node set $V_{tr}$ or is a neighbor node of the node in $V_{tr}$, not allocating resources to the node; otherwise, assessing and allocating resources for the node to be scheduled.

The operation of assessing and allocating resources comprises the following steps:

assessing the nodes, i.e., if the scheduling node $V_{ik}$ results in that at least two node buffers are empty, performing a next step; otherwise, transmitting the node k;

if the scheduling node $v_{ik}$ results in that at least two node buffers are empty, not allocating resource blocks for the node $V_{ik}$ and enabling k=k+2 to assess the node again, wherein k represents the node label; until the scheduling node $v_{ik}$ does not result in that the node buffers are continuously empty or $v_{ik}$ is the last node $N_l$ with data in the node buffer, allocating the resources for the nodes in a reverse order of the node assessment, i.e., k=k−2; allocating resource blocks for the node $v_{ik}$ until all the assessed nodes obtain the resource blocks or the number of the resource blocks allocated for the network i is $C_i$=0; recording all the nodes having the allocated resource blocks into the scheduling node set $V_{tr}$.

The resources are resource blocks and comprise a time slot and an available channel of the time slot.

The resource allocation method for coexistence of multiple line topological industrial wireless networks is used for line topological industrial wireless networks for any network number and any network size. The resource allocation method for coexistence of multiple line topological industrial wireless networks is used for multiple line topological wireless networks.

The present invention has the following beneficial effects and advantages:

1. The present invention does not limit the network number and the network size; and the lower bound of the scheduling delay and the designed resource allocation algorithms are simultaneously applicable to a single network and multiple networks.

2. The present invention uses the overall scheduling delay and the resource utilization ratio as measurement indexes when analyzing the lower bound of delay and designing the resource allocation algorithms, and selects a best node combination in each time slot to occupy as many channel resources as possible to improve the resource utilization ratio and reduce the overall scheduling delay.

DETAILED DESCRIPTION

To make the purpose, the technical solution and the advantages of the present invention more clear, the present invention will be further described below in detail in combination with practical examples.

The present invention proposes an optimized resource allocation method for coexistence of multiple line topological industrial wireless networks. The main idea of the present invention is: a general expression of the lower bound of the scheduling delay is provided; the minimum time slot required for each network to complete the scheduling is adequately considered to provide guidance for algorithm design; different priorities are allocated for the networks based on the analysis of the lower bound of delay, and then resources are allocated for the networks; nodes in the networks are assessed, a best node combination is selected and the number of parallel transmission nodes in each time slot is maximized, to improve the resource utilization ratio. Therefore, on the whole, the method comprises three stages: lower bound analysis of scheduling delay, allocation algorithm of inter-network resources and allocation algorithm of intra-network resources.

1. Modeling of coexistence wireless networks

Figure 1:
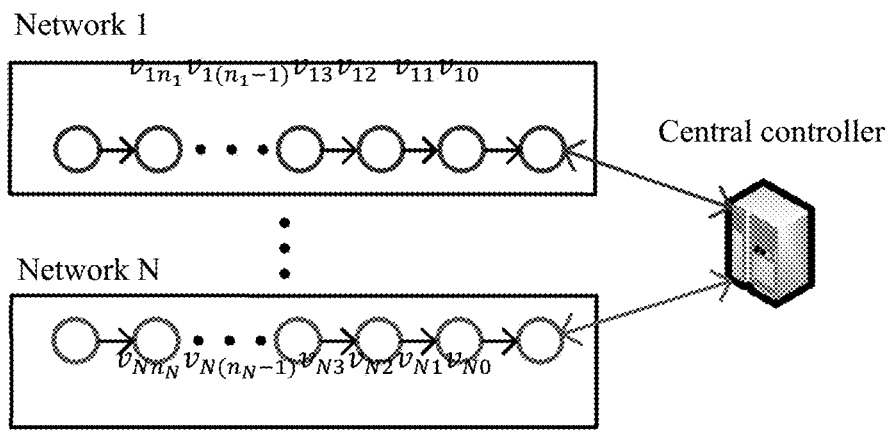
FIG. 1 is a schematic diagram of coexistence of multiple line networks of the present invention.

The method considers multiple line topological wireless networks. As shown in FIG. 1, N wireless networks exist. Each network $i(i \in N)$ is composed of a gateway $v_{i0}$ and a plurality of nodes $v_{ik}$, $k \in [1, n_i]$; $V_{10}$ and $V_{N0}$ respectively represent the gateways in the network 1 and the network N; $V_{1n_1}$ and $V_{Nn_N}$ respectively represent nodes with labels of $n_1$ and $n_N$ in the network 1 and the network N, wherein $n_1$ and $n_N$ respectively represent the total number of nodes included in the network 1 and the network N except the gateways. Because different networks use heterogeneous communication protocols, a central controller is required to be responsible for communicating with multiple networks. In the initialization stage before the start of a scheduling cycle, the gateways transmit information about the number of the nodes of the corresponding networks to the central controller. The central controller generates a scheduling table based on the information about the number of available channels and the number of nodes of each network, and issues the scheduling table to the corresponding networks. After the initialization stage is completed, each node generates a data packet, and transmits the data packet to the gateway through aggregation transmission according to the scheduling table. All the nodes are synchronized for time according to IEEE 1588 standard. Herein, time is divided into multiple time slots of the same length. Each time slot allows to transmit the data packet of one node and the corresponding ACK. All the networks share a set of available channels. Because all the nodes work in the same frequency band and serious mutual interference exists between the networks and inside the networks within the same geographic range, any two nodes cannot use the same channel to transmit data in the same time slot. Each node in the network adopts a half-duplex communication mode. One node cannot receive and transmit the data packets at the same time, that is, adjacent nodes cannot obtain the resources for scheduling at the same time.

2. Lower bound analysis of scheduling delay

N wireless networks exist. Each network $i(i \in N)$ has $n_i$ nodes, and the number of available channels is C. The current time is t; and $R_{idle}(N)$ represents the number of idle resources of N wireless network, and can be calculated by the following general formula:

$$R_{idle}(N) = \sum_{t'=1}^{t'=\lfloor 2C/N \rfloor} \left(C - \left\lceil \frac{t'}{2} \right\rceil N\right), t' = \left[1, 2, 3, \ldots, \left\lfloor \frac{2C}{N} \right\rfloor\right]$$

$R_O(i)$ represents the number of resources occupied by the network i, and can be calculated by the following formula $$R_O(i) = n_i + (n_i - 1) + \cdots + 1 = \frac{n_i(n_i + 1)}{2},$$

When j satisfies the following situation, $$R_{idle}(j) \geq R_{idle}(j) + \left(\sum_{i=1}^{N} R_O(i) - \sum_{i=1}^{j} R_O(i)\right)$$

the general formula of the urn scheduling delay value is:

$$T = \left\lceil \frac{R_{idle}(j) + \sum_{i=1}^{j} R_O(i)}{C} \right\rceil$$

3. The allocation algorithm of inter-network resources comprises the following steps:

Step 1: the purpose of the present invention is to design the allocation algorithm of inter-network resources to minimize the scheduling delay. Firstly, the priority of each network is assessed, and the following two conditions shall be satisfied: $S_r=T-t+1$; $N_d-N_e=N_c-1$.

Figure 2:
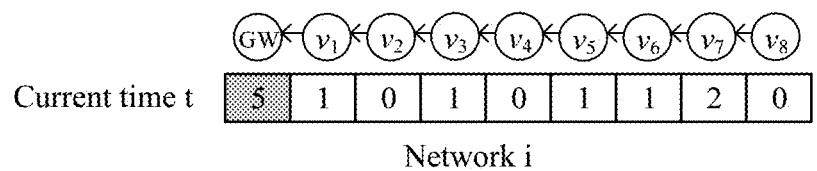
FIG. 2 is a schematic diagram of number of data packets of network node buffers.

Specifically, the lower bound T of the scheduling delay is used as a benchmark; at the current time t, the number of the remaining time slots is (T−t+1); $S_r$ represents the minimum number of time slots required for completing scheduling; $S_r=N_l+2\text{sum}(\max((B_{v_{ik}}(t)-1), 0))+(|N_d|-|N_r|)$ can be obtained by the number of data packets of node buffers in the networks at the current time, wherein $N_l$ represents a last node label with data packet in the node buffer; $B_{v_{ik}}(t)$ represents the number of the data packets in the node buffer of the node $v_{ik}(k \in [1, n_i])$ at the current time t; $N_d$ represents a set of nodes with data packets in a node buffer; $N_e$ represents a set of nodes having data packets in the node buffer and an empty parent node buffer, i.e., $B_{v_{ik}}(t)>0$ and $B_{v_{ik-1}}(t)=0$. When $S_r=T-t+1$ represents that the network is in a critical state, priority must be given to the network. Taking FIG. 2 as an example, FIG. 2 shows the number of the data packets of the node buffers in the networks at the current time. Then, the network $N_l=7$. $2\text{sum}(\max)(B_{v_{ik}}(t)-1), 0))=2$, $|N_d|=5$ and $|N_e|=3$. Therefore, the number of the minimum time slots required by the networks is $S_r=11$.

$N_c$ represents the number of nodes having continuous data packets farthest from the gateway; and $|N_d|-|N_e|=N_c-1$ represents the situation that nodes with continuous data in the networks only appear in the position farthest from the gateway. Taking FIG. 2 as an example, GW represents the gateway; $v_1$-$v_8$ represent the nodes in the networks; and the number of data packets of each node buffer at the current time is labeled in the table in sequence. The network $N_c=3$ and $|N_e|=2$; and the equation $|N_d|-|N_e|=N_c-1$ is satisfied. The networks that satisfy the two conditions are set as high priority, and $|N_e|$ resource blocks are allocated for each network until no idle resource block remains or all the networks with high priority have the allocated resource blocks. In addition, other networks are set as low priority.

Step 2: if no idle resource remains at this time, the allocation of the inter-network resources is completed in the current time slot. If the idle resources remain, the remaining resources are allocated for the networks with low priority, and step 3 is performed.

Step 3: the remaining networks with low priority are sorted in the descending order of the minimum number of time slots required to complete scheduling, and searched in the descending order. For the network having the difference between the required minimum numbers of the time slots less than or equal to 1, step 4 is performed; otherwise, for the network having the difference between the required minimum numbers of the time slots greater than 1, step 7 is performed.

Step 4: for the network having the difference between the required minimum numbers of the time slots not greater than 1, the node buffers of the network nodes that satisfy the conditions are combined, and different networks are separated by 0 node buffer. Specifically, when the difference is 1, step 5 is performed; otherwise, when the difference is 0, step 6 is performed.

Figure 3:
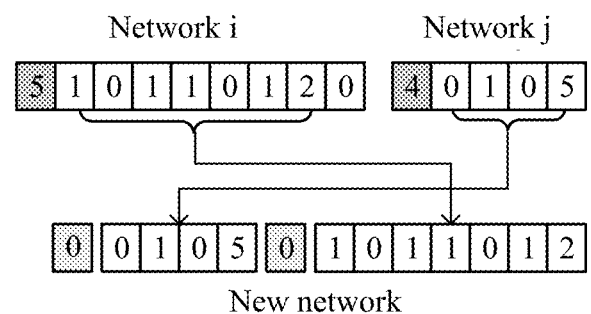
FIG. 3 is a schematic diagram of a combined new network when a difference of required minimum time slot number $S_r$ is 1.

Step 5: when the difference of the minimum number $S_r$ of the time slots required by the networks is 1, the networks are sorted in a descending order of $S_r$; the node buffers of the node $v_{i1}$ to the last node $v_{iN_l}$ with data in the corresponding networks are combined; and different networks are separated by empty identifiers (0 node buffer). As show in FIG. 3, at this moment, the minimum number of the time slots required by the network i is 11, the minimum number of the time slots required by the network j is 12, and the difference between the minimum numbers of the time slots required by the two networks is 1. Therefore, according to the step 4, the node buffers of two network nodes are combined; and the $S_r$ value of the network j is greater than the $S_r$ value of the network i according to the rule in the step 5. Therefore, the network j is placed in the front half part, network i is placed in the back half part, and an empty identifier is placed in the middle, that is, separated by 0 node buffer.

Figure 4:
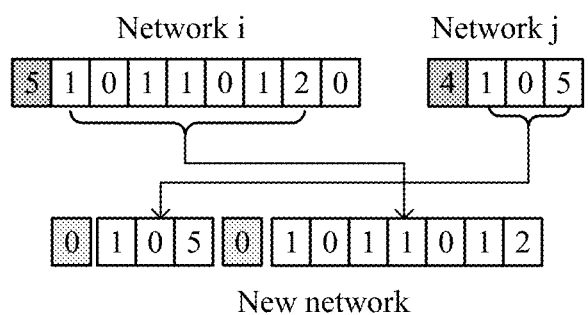
FIG. 4 is a schematic diagram of a combined new network when a difference of required minimum time slot number $S_r$ is 0.

Step 6: when the difference of the minimum number of the time slots required by the networks is 0, the numbers of the resources required by the networks are sorted; the required numbers $R_r$ of the resources are combined in the descending order; the buffers of the node $v_{i1}$ to the last node $v_{iN_l}$ with data in the corresponding networks are combined; and each network is separated by empty identifier (0 node buffer). $R_r$ can be calculated by the number of the data packets in the node buffers: $R_r = \Sigma_{k=1}^{n_i}(B_{v_{ik}}(t) \cdot k)$. As show in FIG. 4, at this moment, the minimum numbers of the time slots required by the network i and the network j are 11, and the difference between the minimum numbers of the time slots required by the two networks is 0. Therefore, according to the step 4, the node buffers of two network nodes are combined; and the number of the resources required by the network i is 28 and the minimum number of the time slots required by the network j is 16 according to the rule in the step 6. Therefore, the network j is placed in the front half part, the network i is placed in the back half part, and an empty identifier is placed in the middle, that is, separated by 0 node buffer.

Step 7: the networks having the difference between the required minimum numbers of the time slots greater than 1 (the networks used to calculate the difference) are sorted in the descending order.

Specifically, the sorted networks comprise a combined new network. Therefore, the remaining resources are firstly allocated to the network with large $S_r$ in order, and the maximum number of resources that can be transmitted in parallel is allocated. If the resources remain at this moment, the resources are allocated for the next network until no idle resource remains or all the networks are allocated with the corresponding resources.

4. Allocation algorithm of intra-network resources

The allocation of the inter-network resources is completed. Each network obtains the corresponding resources. Taking an example that the network i obtains $C_i$ resource blocks at the current time, the allocation of the intra-network resources is divided into the following steps:

Step 1: the nodes are assessed, and the resources are reasonably allocated for the nodes in the networks. Specifically, two situations exist lithe node $v_{ik}$ is transmitted, two or more node buffers are empty and step 2 is performed; otherwise, the data packet of the node with a label of k is transmitted.

Step 2: the purpose of the present invention is to select an optimal node combination to maximize the resource utilization ration, thereby achieving the purpose of minimizing the scheduling delay. Therefore, before the intra-network resources are allocated, each node to be scheduled is assessed. For the network i., if the scheduling node $V_{ik}$ results in that two or more node buffers are empty, resource blocks are not allocated for the node $V_{ik}$ and k=k+2 is held to assess the node again. Until the scheduling node $V_{ik}$ does not result in that the node buffers are continuously empty or $V_{ik}$ is the last node $N_l$ with data in the node buffer, the resources are allocated for the assessed nodes in a reverse order of the node assessment, i.e., resource blocks are allocated for $V_{ik}$. k=k−2; resource blocks are allocated for the node $v_{ik}$ until all the assessed nodes obtain the resource blocks or the number of the resource blocks allocated for the network i is $C_i$=0. All the nodes having the allocated resource blocks are recorded into a scheduling node set $V_{tr}$, to avoid repeatedly allocating the resource blocks and simultaneously allocating the resource blocks for adjacent nodes. $C_i$ represents the number of the resource blocks allocated for the network i at the current time t.

Step 3: a data packet filling process: the node set that meets the conditions $B_{v_{ik}}(t)>0$ and $B_{v_{ik-1}}(t)=0$ are searched in all the nodes of the current network; the nodes are sorted in an ascending order of sequence number i; and the step 1 is performed on the nodes for assessing and allocating resources. If $C_i$ resource blocks do not remain, the data packet filling process is completed, otherwise next judgment is needed.

Step 3: a data packet collecting process: the nodes are searched forwards from the node $v_{iN_l}$; a node with data packets in the node butler is used as a node to be scheduled and compared with the nodes recorded in $V_{tr}$; if the node to be scheduled appears in $V_{tr}$ or is a neighbor node of the node in $V_{tr}$, the resources are not allocated to the node; otherwise, the step 1 is performed on the node to be scheduled for assessing and allocating the resources.

The invention claimed is:

1. A resource allocation method for coexistence of multiple line topological industrial wireless networks, comprising the following steps:
    obtaining a minimum scheduling delay value required for each network to complete scheduling;
    allocating resources for the networks based on the minimum scheduling delay value; and
    allocating intra-network resources of the networks,
    wherein the step of allocating resources for the networks based on the minimum scheduling delay value further comprises:
    assessing a priority of each network according to conditions: $S_r$=T−t+1 and $N_d$−$N_e$=$N_c$−1, $S_r$ being a minimum number of time slots required for completing scheduling, $N_d$ being a set of nodes with data packets in a node buffer, $N_e$ being a set of nodes having data packets in the node buffer and an empty parent node buffer, $N_c$ being a number of nodes with continuous data packets farthest from a gateway, t being current time, and T being a minimum scheduling delay value,
    when the network satisfies the conditions, accessing the network as a high priority and allocating $|N_e|$ resource blocks the network,
    when the network fails to sasatisfy the conditions, assessing the network as low priority, and sorting the networks in a descending order of $S_r$, according to the required minimum number $S_r$ of time slots obtained during priority assessment, and calculating a difference between every two adjacent $S_r$ according to a first scenario in which the difference is not greater than 1 and a second scenario in which the difference is greater than 1;
    for the networks corresponding to the first scenario:
    when the difference of $S_r$ is 1, sorting the networks corresponding to $S_r$ in a descending order of $S_r$, and combining first to $N_l$ node buffers in the networks to form a new network, wherein first $N_l$ in the new network are separated by empty identifiers, and $N_l$ represents a node label of a last node buffer with data packets;
    when the dif erence $S_r$ is 0, comparing a number $R_r$ of required resources of the networks corresponding to $S_r$, sorting the corresponding networks in a descending order of $R_r$; and combining the first to $N_l$ node buffers in the networks to form a new network, wherein the first to $N_l$ node buffers in the new network are separated by empty identifiers, and recording $S_r$ of the new network as a maximum value of $S_r$ in the corresponding networks;
    for the networks corresponding to the second scenario:
    sorting the networks in a descending order of $S_r$ and allocating $N_p$ resource blocks to each network in order, until no idle resource block remains or all the networks have the allocated resource blocks, wherein $N_p$ represents a maximum number of parallel transmission nodes.

2. The resource allocation method for coexistence of multiple line topological industrial wireless networks according to claim 1, wherein the minimum scheduling delay value is:

$$T = \left\lceil \frac{R_{idle}(j) + \sum_{i=1}^{j} R_o(i)}{C} \right\rceil$$

wherein $R_{idle}(j)$ represents a number of idle resource blocks of j networks, and $R_o(i)$ represents a number of resource blocks occupied by network i, which are respectively represented by the following expressions:

$$R_{idle}(N) = \sum_{t'=1}^{t'=\lfloor 2C/N \rfloor} \left(C - \left\lceil \frac{t'}{2} \right\rceil N\right), t' = \left[1, 2, 3, \ldots, \left\lfloor \frac{2C}{N} \right\rfloor\right],$$

$$R_o(i) = n_i + (n_i - 1) + \ldots + 1 = \frac{n_i(n_i + 1)}{2},$$

N is a number of wireless networks in line topology, and a number of nodes of network i is $n_i$, $i \in N$, and a number of available channels in the networks is C.

3. The resource allocation method for coexistence of multiple line topological industrial wireless networks according to claim 1, wherein $R_r = \sum_{k=1}^{n_i}(B_{v_{ik}}(t) \cdot B_{v_{ik}}(t)$ represents a number number of data packets in the node buffer of a scheduling node $v_{ik}$ at the current time t, wherein $k \in [1, n_i]$ and $n_i$ is a number of nodes in the network.

4. The resource allocation method for coexistence of multiple line topological industrial wireless networks according to claim 1, wherein the step of allocating intra-network resources of the networks comprises a data packet filling process and a data packet collecting process,
wherein the data packet filling process further comprises: searching for a node set that meets the conditions $B_{v_{ik}}(t) > 0$ and $B_{v_{ik-1}}(t) = 0$, sorting in an ascending order of sequence number k and assessing and allocating resources for the nodes that meet the conditions; when $C_i$ resource blocks do not remain, completing the data packet filling process, otherwise, performing a data packet collecting process, wherein $C_i$ represents a number of resource blocks allocated to network i at the current time t;
wherein the data packet collecting process further comprises: searching for nodes in the descending order of node labels from the last node $v_{iN_l}$ with data in the node buffer, and using a node with data packets in the node buffer as a node to be scheduled and comparing with the nodes recorded in a scheduling node set $V_{tr}$; when the node to be scheduled appears in the scheduling node set $V_{tr}$ or is a neighbor node of the node in $V_{tr}$, not allocating resources to the node; otherwise, assessing and allocating resources for the node to be scheduled.

5. The resource allocation method for coexistence of multiple line topological industrial wireless networks according to claim 4, of wherein the step of assessing and allocating resources comprises the following steps:
assessing the nodes, wherein
when a scheduling node $v_{ik}$ does not result in that at least two node buffers are empty, transmitting a node k;
when the scheduling node $v_{ik}$ results in that at least two node buffers are empty, not allocating resource blocks for the scheduling node $v_{ik}$; and
enabling k=k+2 to assess a node again, k being the node label, until the scheduling node $v_{ik}$ does not result in that the node buffers are continuously empty or $v_{ik}$ is the last node $N_l$ with data in the node buffer;
allocating the resources for the nodes in a reverse order of a node assessment in that k=k−2;
allocating resource blocks for the scheduling node $v_{ik}$ until all the assessed nodes obtain the resource blocks or the number of the resource blocks allocated for the network i is 0; and
recording all the nodes having the allocated resource blocks into the scheduling node set $V_{tr}$.

6. The resource allocation method for coexistence of multiple line topological industrial wireless networks according to claim 1, wherein the resources are resource blocks and comprise a time slot and an available channel of the time slot.

7. The resource allocation method for coexistence of multiple line topological industrial wireless networks according to claim 1, wherein the resource allocation method is used for line topological industrial wireless networks for any network number and any network size.

8. The resource allocation method for coexistence of multiple line topological industrial wireless networks according to claim 1, wherein the resource allocation method is used for multiple line topological wireless networks.

9. A resource allocation method for coexistence of multiple line topological industrial wireless networks, comprising the following steps:
obtaining a minimum scheduling delay value required for each network to complete scheduling;
allocating resources for the networks based on the minimum scheduling delay value; and
allocating intra-network resources of the networks,
wherein the step of allocating intra-network resources of the networks comprises:
assessing a plurality of nodes, wherein,
when a scheduling node $v_{ik}$ does not result in that at least two node buffers are empty, transmitting the a node k;
when the scheduling node $v_{ik}$ results in that at least two node buffers are empty, not allocating resource blocks for the scheduling node $v_{ik}$ ;
enabling k=k+2 to assess the scheduling node $v_{ik}$ again, k being the node label, until the scheduling node $v_{ik}$ does not result in that the node buffers are continuously empty or $v_{ik}$ is a last node $N_l$ with data in the node buffer;
allocating the resources for the nodes in a reverse order of a node assessment in that k=k−2;
allocating resource blocks for the scheduling node $v_{ik}$ until all the assessed nodes obtain the resource blocks or the number of the resource blocks allocated for the network i is 0; and
recording all the nodes having the allocated resource blocks into a scheduling node set $V_{tr}$.

* * * * *